United States Patent [19]
el Din Nasser

[11] Patent Number: 4,514,260
[45] Date of Patent: Apr. 30, 1985

[54] APPARATUS FOR THE DESALINATION OF SEA WATER

[75] Inventor: Gamal el Din Nasser, Puchheim, Fed. Rep. of Germany

[73] Assignee: D.V.T. Büro für Anwendung Deutscher Verfahrenstechnik H. Morsy, Dusseldorf, Fed. Rep. of Germany

[21] Appl. No.: 496,708

[22] Filed: May 20, 1983

[30] Foreign Application Priority Data

May 24, 1982 [DE] Fed. Rep. of Germany ....... 3219456

[51] Int. Cl.³ .............................................. B01D 3/00
[52] U.S. Cl. ................................. 202/270; 159/17 R; 159/DIG. 8; 203/DIG. 17
[58] Field of Search .......................... 52/127.1, 127.7; 182/141, 149; 414/10, 11, 12; 159/17 R, 17 P, 17 VS, 17 C, DIG. 8; 202/172-174, 158, 270; 203/71, 72, DIG. 17, DIG. 24

[56] References Cited

U.S. PATENT DOCUMENTS 3,974,618 8/1976 Cortina ................................. 414/11

Primary Examiner—Frank Sever
Attorney, Agent, or Firm—Toren, McGeady, Stanger, Goldberg & Kiel

[57] ABSTRACT

Apparatus for a vertically extending heat exchanger column for the desalination of sea water based on a multi-effect evaporation process includes a container for forming a pressure-tight enclosure about the heat exchanger column. The container is made up of four upwardly extending side walls, a top end wall and a bottom end wall. The side walls are arranged in pairs with the walls of each pair spaced opposite one another. A truss-like support structure is arranged around the outside of the container with one pair of side walls and the top and bottom end walls fixed to the support structure. The other pair of side walls are movably secured to the support structure. Lifting tackle is located on the upper end of the support structure. Movable platforms are mounted along the movable side walls of the container. Snap closures secure the movable side walls to the other side walls and to the end walls. Seals are provided along the movable side walls for the pressure tight enclosure of the container.

10 Claims, 5 Drawing Figures

APPARATUS FOR THE DESALINATION OF SEA WATER

SUMMARY OF THE INVENTION

The present invention is directed to an apparatus for the pressure-tight enclosure of a heat exchanger, particularly of a heat exchanger apparatus for desalinating sea water by a multi-effect evaporation process.

It is generally known to construct heat exchanger column containers with assembly and maintenance openings located on the periphery of the apparatus and to anchor the container for stability on a base or foundation. Even in the case of a column located within a pressurized container having a height of up to 100 m and installed at a location where it is exposed to adverse environmental conditions, it is conventional practice for such a container to be anchored at its base on a foundation. In the case of a very narrow column, for example with diameter of approximately 2 m and a height of over 50 m, it is also conventional practice to install the container in a support structure designed according to steel construction practice to be capable of safely withstanding expected wind forces (note the discussion in Taschenbuch für Maschinenbau, Vol. 2, VEB Verlag Technik, Berlin 1976, page 907).

The assembly of heat exchanger columns, that is columns of regularly arranged units, in such tall containers causes considerable problems, particularly if the units are constructed as a plurality of identical bodies, (quite apart from the fact that the manufacture, transportation and assembly of narrow containers with a relatively great height is far from easy). These problems are frequently encountered in connection with apparatus for desalinating sea water by a multi-effect evaporation process, because such apparatus requires a large number of similarly constructed evaporation stages which must be installed and maintained within the container.

It is a primary object of the present invention to provide a novel arrangement for a narrow and tall container, which is suitable for installation outdoors, is easy to manufacture, transport and assemble, and affords relatively simple assembly and subsequent maintenance of heat exchanger columns to be housed in a pressure-tight manner in the container. Preferably, the container is constructed so that it will maintain its original characteristics over long operating periods and under adverse environmental conditions.

In accordance with the present invention, a container assembly for the pressure-tight enclosure of a heat exchanger column comprises a container formed by four upstanding side walls disposed in two opposed pairs. One pair of opposed side walls together with opposed end walls forming the top and bottom of the container are fixed relative to a support structure for the container. The support structure is located externally of the container and the other pair of opposed side walls are movably secured so that the two opposite sides of the container can be opened. The opposed movable side walls are releasably secured to the fixed side and end walls to afford a pressure-tight sealed enclosure for the container. At least one working platform can be raised and lowered along one of the movable side walls. At least one lifting tackle unit is mounted on the support structure for displacing at least one of the movable side walls into the open position when the means latching the side wall in the closed position is released.

Preferably, the latch means is made up of at least one group of latch members supported on at least one of the side walls and the end walls of the container by a thrust rod displaceable relative to the wall on which the latch members are supported to engage or disengage the latch members, with or out lock openings, in pegs or abutments carried by one of the movable side walls so that the movable side wall can be secured as a part of the sealed container or released for movement from the container. Usually, groups of the latch members will be engageable with corresponding groups of pegs which extend through apertures in flanges on the fixed walls for securing the movable walls as a part of the container. Preferably, the latch members are wedge-shaped so that when they are displaced by the thrust rod into engagement with the pegs they urge the movable side wall associated with the pegs in sealing relationship on the container.

In a preferred arrangement, sealing means are provided between each movable wall and the side or end wall with which the removable wall forms a seal. Conveniently, the sealing means is an inflatable peripheral seal carried by the fixed side and end walls.

One preferred construction of the support structure has four corner framework assemblies with vertically spaced assembly platforms located between a pair of the assemblies and another group of vertically spaced assembly platforms located between another pair of the assemblies. The assembly platforms in the two groups are located on opposite sides of the container with the fixed side walls each located inwardly of and adjacent one of the groups of platforms. Two working platforms may be provided, one associated with each of the two movable side walls. The working platforms extend between the two groups of assembly platforms. In a preferred arrangement two lifting tackle units are mounted on guide rail at the top of the framework structure and each unit is associated with a different one of the movable side walls. Further, the container assembly encloses a heat exchange apparatus for desalinating sea water by a multi-effect process and a vertically extending column of heat exchangers is located in the container.

Based on the construction of the container and its support structure, it is possible, for the first time, to assemble and maintain the heat exchanger columns in the container on a pair of its opposite sides. This arrangement is particularly advantageous if the heat exchanger column or columns is made up of a plurality of similarly constructed heat exchanger plates, for example, as disclosed in my co-pending patent application Ser. No. 496,713 filed May 20, 1983, and note also my co-pending patent application Ser. No. 496,709 filed the same day. After suitable foundations for the support structure are laid, the corner framework assemblies can be erected and interconnected by trusses or the like. With the lifting tackle unit or units mounted on the top of the support structure, the lifting units can be employed to facilitate the handling and assembly of the container components made up of usually rectangular, flat or curved side walls and top and bottom end walls, as well as for the handling of the heat exchanger column or columns. After the container is placed on the foundation, the foundation is fixed to the support structure. With the heat exchanger column located within the container, operation can be initiated after the necessary pipes and other lines are connected to the apparatus.

Preferably, an inflatable seal is provided between each of the facing sealing surfaces, (conveniently constructed as flanged joints) of the movable and fixed container walls. The seal may extend continuously around the periphery of the sealing surfaces and be made of an elastic material. If the seal is inflated after locking the movable side walls in place, the container is placed in a pressure-tight condition. In view of considerable height of the container, the latch members are conveniently subdivided into groups with the members in each group arranged for displacement by a fluid pressure, usually hydraulically operated connecting rods. As a result, though the relatively narrow container has considerable elasticity, it can be ensured that the necessary seals are effected around the movable side walls. After the movable side walls are moved out of the closed position, the container is freely accessible on two opposite sides by means of the working platforms which are installed for optional vertical movement within the support structure. In this way, the installation and removal of the heat exchanger columns, as well as their maintenance, is greatly facilitated.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
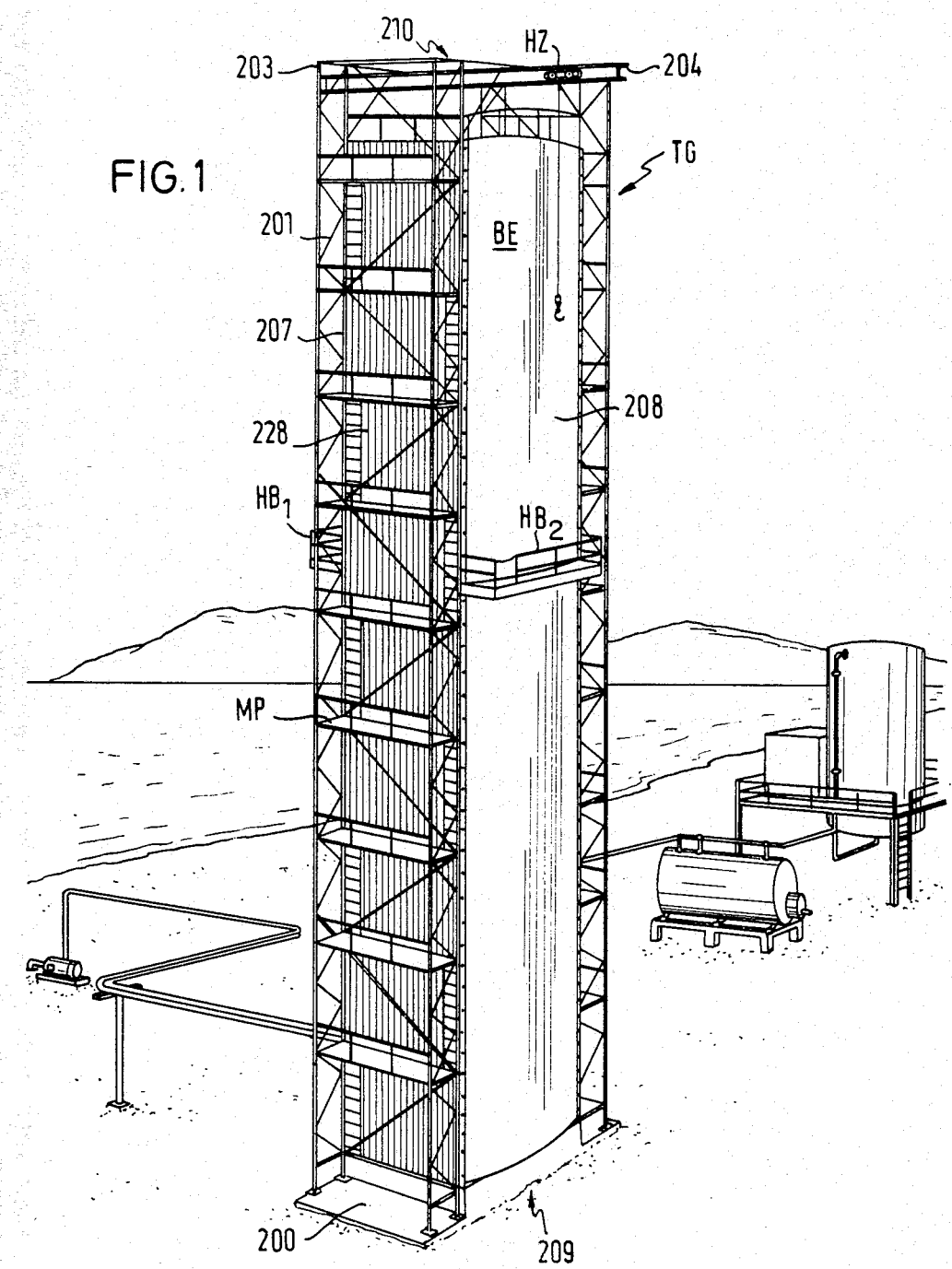
FIG. 1 is a perspective view of the container assembly embodying the present invention including a support structure.
Figure 2:
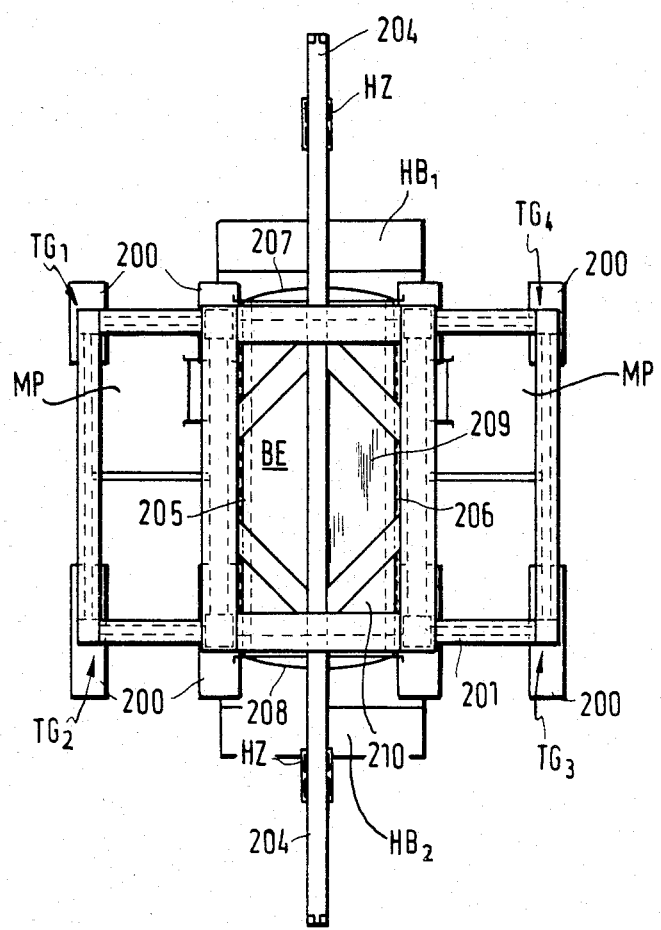
FIG. 2 is a plan view of the assembly shown in FIG. 1.

As illustrated in the drawing, the container assembly includes a tall narrow sided container BE extending vertically within a support structure TG and mounted on a foundation 200 anchored in the ground. The support structure TG is made up of four corner framework assemblies $TG_1$ to $TG_4$ made up of trusslike frames in accordance with standard steel construction. While the base of the container BE rests on the foundation 200 the remainder of the upwardly extending container is fixed to the support structure. A top frame 203 is secured to the upper ends of the frame trusses 201 and a guide rail is mounted on the upper frame for supporting two lifting tackle units HZ each extending downwardly along an opposite side of the container BE. A plurality, in the illustrated embodiment nine, of vertically spaced assembly platforms MP extend between the framework assemblies $TG_1$–$TG_2$ and between the other pair of assemblies $TG_3$–$TG_4$. In addition, the support structure includes two oppositely located working platforms $HB_1$ and $HB_2$ which extend along the sides of the container extending between the sides over which the platforms MP are located. Working platforms $HB_1$ and $HB_2$ can be raised and lowered by motors and control elements, not shown, into any random height position within their control range.

Laterally the container is formed by four upstanding side walls 205 to 208 arranged in opposed pairs. Side walls 205, 206 are substantially flat, parallel, and are positioned along the sides of the support structure where the assembly platforms MP are located. The side walls 205, 206 are fixed to the support structure TG. The other pair of opposite side walls 207, 208 are bowed or curved outwardly and are located on the sides of the support structure where the lifting platforms $HB_1$, $HB_2$ are located. Side walls 207, 208 are readily movable relative to the remainder of the container BE and the support structure TG so that the opposite sides of the container can be opened. Latches SV secure the movable side walls in the closed position. The container BE has opposed lower and upper end walls 209, 210 fixed to the side walls and forming the bottom and top of the container.

Figure 3:
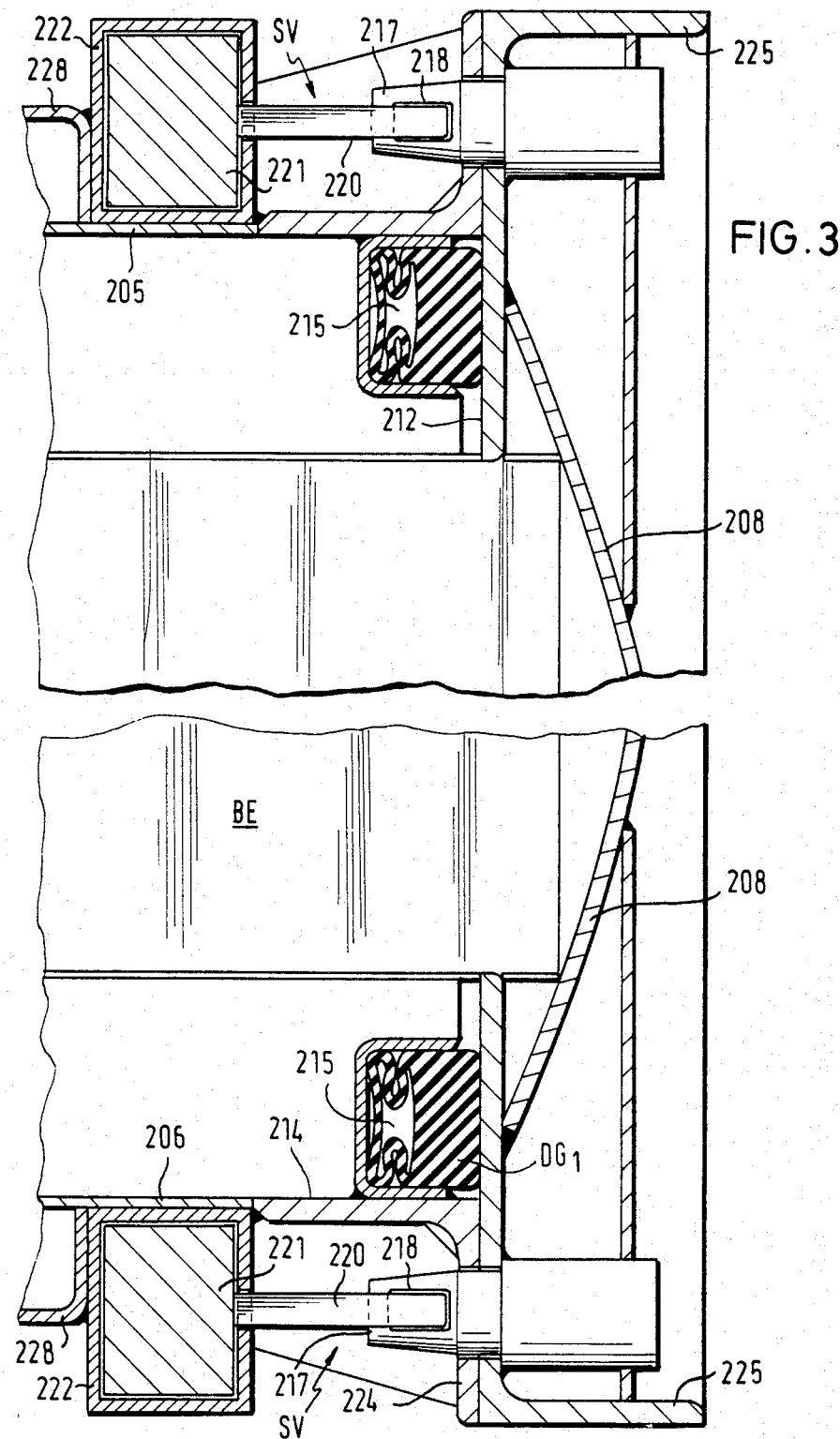
FIG. 3 is a transverse sectional view of a portion of the container assembly shown in FIG. 1 illustrating the locking arrangement for the movable side walls of the container.

Each of the movable or removable side walls 207, 208 forms a sealed joint when secured by the latches SV against the flanges, note FIG. 3, provided on the fixed side walls 205, 206 and the lower and upper end walls 209, 210. Accordingly, the latches SV are uniformly distributed along the marginal edges of the sealing surfaces 212 of the movable side walls 207, 208 and the opposite sealing surfaces 213 of the fixed side and end walls 205, 206, 209 and 210.

An inflatable, preferably elastomeric, seal $DG_1$ is provided between the sealing surfaces 212, 213 formed on the movable side walls and the fixed container walls. The seal $DG_1$ extends continuously and endlessly around the periphery of the fixed container walls at the location of the movable side walls. A compressor, not shown, is provided for pressurizing the inner chambers of the seals $DG_1$ when the walls 207, 208 are closed and secured by the latches SV forming a seal between the movable and fixed walls of the container BE.

Figure 4:
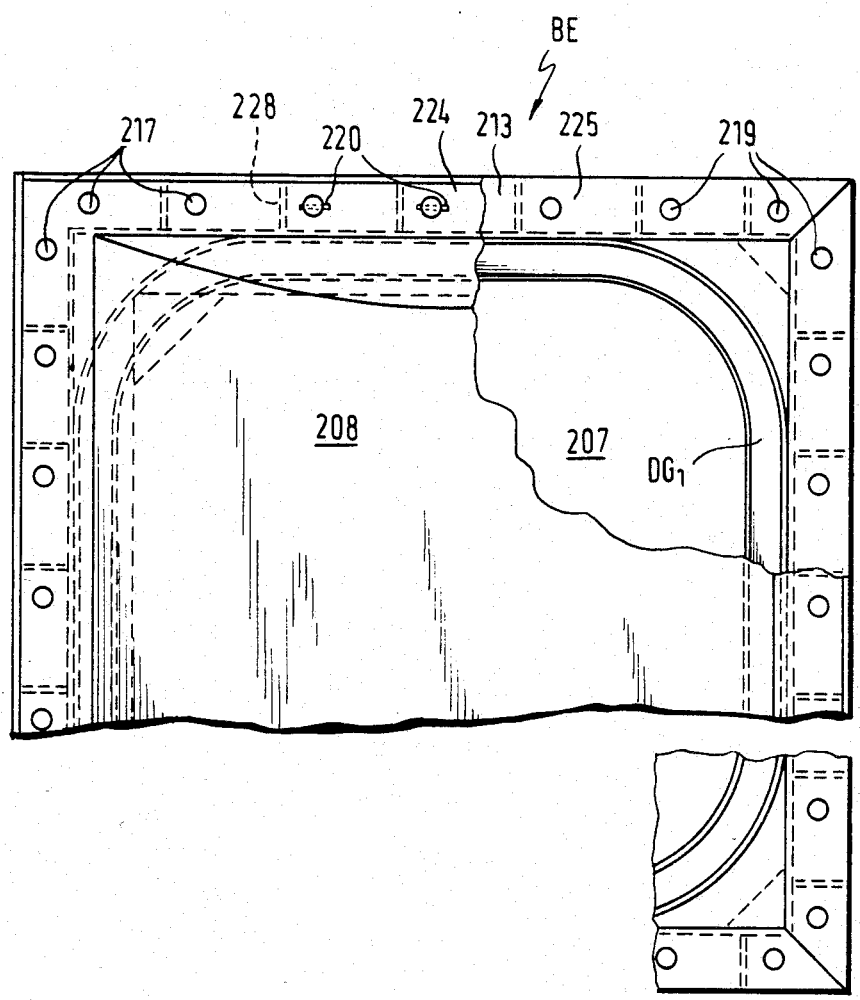
FIG. 4 is a partial side view, with a portion of the container broken away, of one of the movable side walls of the container assembly illustrated in FIG. 1.
Figure 5:
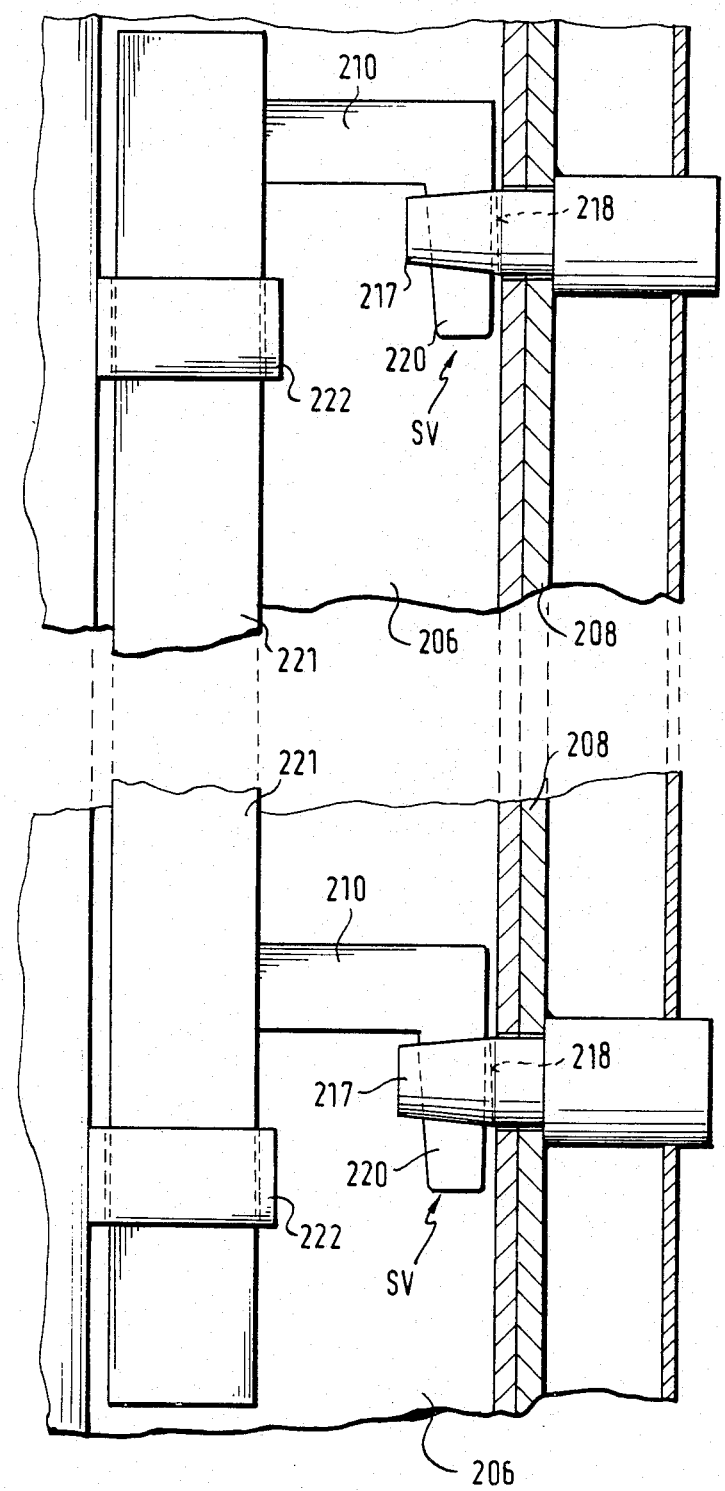
FIG. 5 is a vertically extending sectional view of a portion of the locking system shown in FIG. 3 illustrating movable latch members.

As illustrated particularly in FIGS. 3 to 5, the latches SV are formed of pegs 217 uniformly spaced along the peripheral region of the sealing surface 212 on the movable container walls 207, 208. Each of the pegs 217 is fixed to the corresponding movable wall and is aligned to be received within and pass through an aperture 219 in the sealing surface 213 of the corresponding fixed container walls 205, 206, 209 and 210. Each peg 217 is provided with a locking slot or opening 218 and several of these openings are in alignment and in the same plane forming groups of such pegs so that the openings 218 are engageable by wedge-shaped latch members 220 mounted on a thrust rod 221 common for all of the pegs in the same group. Conveniently, each group contains eight pegs. The thrust rods 221 are mounted to be hydraulically reciprocable in supports 222 located in the vicinity of the sealing surfaces 213 and secured to the fixed container walls.

As illustrated in FIGS. 3 and 4, the opposing sealing surfaces 212, 213 are formed by angle sections 224, 225. Angle sections 224 is an unequal-sided member with one side welded to form part of the fixed side walls and end walls 205, 206, 209 and 210 of the container. The angle section 225 is also an unequal-sided member and forms in each of the movable side walls 207, 208 a frame for the bowed or curved wall surface of these side walls, note FIG. 3. In the closed state of the container BE, the pegs 217 project through the openings 219 in the flanges formed by the angle section 224 so that the pegs 217 and the movable side walls on which they are mounted, are held and biased into the sealing position as shown in FIG. 5 by the wedge-shaped latch members 220 engageable in the locking slots 218 of the pegs.

By displacing the latch members 220 out of engagement with the locking slots 218 in the pegs 217, the movable side walls 207, 208 are released and can be moved out of the closed position by lifting tackle units HZ to afford access to the interior of the container BE. As a result, the interior of the container BE is freely accessible from two opposite sides. Prior to removing one or both of the side walls 207, 208, the appropriate one or both of the working platforms $HB_1$ and $HB_2$ are moved into the top or bottom region of the support structure TG so as to be clear of the range of movement of the corresponding movable side wall. Prior to releasing the movable side walls 207, 208, the seals $DG_1$ should be released by deflating their cavities 215.

Further, for affording a complete description, it should be noted that the fixed side walls 205, 206 are reinforced by U-shaped sections 228 welded to the outer faces of these walls, note FIG. 3.

While specific embodiments of the invention have been shown and described in detail to illustrate the application of the inventive principles, it will be understood that the invention may be embodied otherwise without departing from such principles.

I claim:

1. Apparatus for the pressure-tight enclosure of a column, such as a heat exchanger column for desalinating sea water in a multi-effect evaporation process, comprising elements designed, sized and arranged for facilitating manufacture, transport, assembly and maintenance of a tall, narrow pressure-tight heat exchange column including an upwardly extending support structure, an upwardly extending tall narrow container positioned within said support structure and including four upwardly extending elongated side walls arranged in two pairs with said side walls of each said pair facing one another and disposed in spaced relation, and two spaced facing end walls extending across the opposite ends of said side walls and forming the top and bottom of said container, said end walls and one pair of said side walls are fixed to said support structure and the other pair of said side walls are movably secured to the support structure, a lifting tackle is located on said support structure above said top end wall of said container, a movable working platform located across each movable side wall of said container form movement in the upward direction, and means for securing said movable side walls in pressure-tight condition relative to said side walls and end walls fixed to said support structure and said means being releasable for moving said movable side walls into the open position for affording access to the interior of the said container.

2. Apparatus, as set forth in claim 1, wherein that said means for securing said movable side walls in the closed position includes abutments mounted on said movable side walls and engageable in openings in said side walls and end walls secured to said support structure, and latch members mounted on said side walls and end walls secured to said support structure for engagement with said abutments, and said latch members combined together in groups, and each said group includes a movable displaceable thrust rod for displacing said latch members as a group into and out of engagement with said abutments.

3. Apparatus, as set forth in claim 2, wherein said movable side walls and said side walls and end walls fixed to said support structure each have sealing surfaces, and said sealing surfaces are in the form of flange joints engageable with one another.

4. Apparatus, as set forth in claim 2, including an inflatable seal extending around the opening into said container formed by said movable side walls, said seal being made of an elastic material, and said seal arranged to extend between the sealing surfaces of said movable side walls and of said side walls and end walls fixed to said support structure and to form a pressure-tight seal.

5. Apparatus, as set forth in claim 4, wherein said inflatable seal is secured to said side walls and end walls fixed to said support structure and when inflated is engagable with said movable side walls of said container.

6. Apparatus, as set forth in claim 2, wherein said thrust rods are hydraulically operable.

7. Apparatus, as set forth in claim 2, wherein said abutments are peg-shaped and extend through openings in said side walls fixed to said support structure, said pegs having openings therethrough, said latch members are wedge-shaped and are arranged to extend into the openings in said pegs for forcing said movable side wall associated with said pegs into sealing relation with the side walls and end walls fixed to said support structure.

8. Apparatus, as set forth in claim 1, wherein said support structure comprises four upwardly extending frame trusses with each of said frame trusses located a different corner of said container, each of said frame trusses forming a rectangular member extending outwardly from one corner of said container approximately at right angles to said side walls fixed to said support structure, said support structure including a top frame extending across the upper ends of said frame trusses, a guide rail mounted on said top frame and projecting outwardly from the sides of said container formed by said movable side walls, and said lifting tackle mounted on said guide rail for moving said movable side walls and for handling the column within said container.

9. Apparatus, as set forth in claim 8, wherein said frame trusses located at the opposite ends of one of said side walls fixed to said support structure are arranged in opposite aligned relation and a plurality of vertically spaced assembly platforms are supported on each of said pairs of frame trusses.

10. Apparatus, as set forth in claim 1, wherein said movable side walls between said side walls fixed to said support structure have an outwardly curved configuration and said side walls fixed to said support structure are planar and in parallel relation.

* * * * *